Patented Oct. 31, 1933

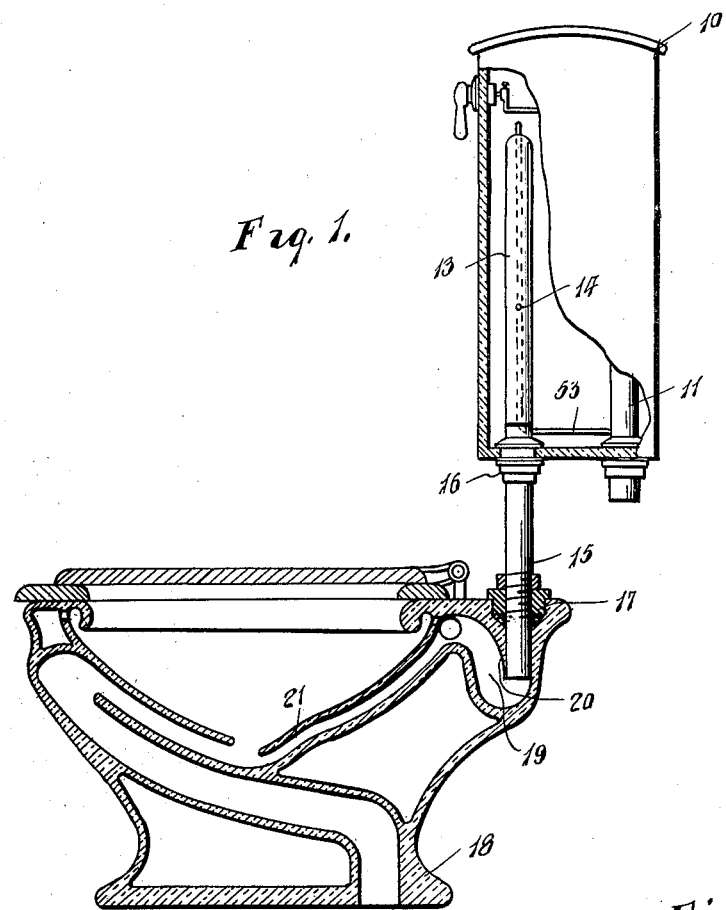
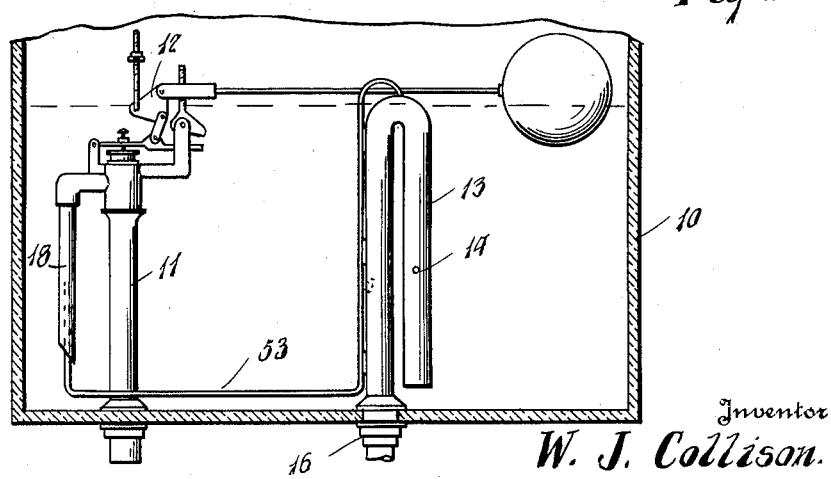

1,933,416

UNITED STATES PATENT OFFICE 1,933,416

FLUSHING DEVICE

William J. Collison, Bakersfield, Calif.

Application February 17, 1932. Serial No. 593,665

1 Claim. (Cl. 4—42)

This invention relates to a flushing device and relates particularly to that type of flushing device shown and described in my Patent No. 1,842,715, issued January 26, 1932.

The present construction aims to generally simplify the apparatus or device and more particularly to provide a bowl in which the trap connected with the siphon may be cast, molded or baked as an integral part of the bowl and in which the siphon tube may be cast, molded, baked or formed as a part of the flush tank.

The more specific objects and advantages will become apparent from a consideration of the description following taken in connection with accompanying drawing illustrating an operative embodiment.

In said drawing:—

Figure 1 is a view through the device in central vertical section, and

Figure 2 is a view through the flush tank taken at a right angle to Figure 1.

Referring specifically to the drawing, 10 designates a flush tank which has a water supply pipe 11 associated therewith, controlled by a float-controlled valve mechanism at 12 of the same construction as disclosed in the said Patent No. 1,842,715.

The tank 10 may be of any suitable material for instance baked clay, vitreous china or the like and preferably integral therewith is a siphon tube 13 having a vent 14 therein. A refill tube like that in said patent, is shown at 53 extending into a tube 18 to receive water from the supply pipe 11 as in said patent. The refill tube 53 extends to the highest water level to prevent a continuous running of the water and also extends to the lowest water level to insure a perfect air seal.

A brass spud 15 is detachably connected in any suitable manner at 16 in communication with the siphon tube 13, and at its other end is detachably connected in any suitable manner as at 17, to a bowl or hopper 18.

The bowl or hopper 18 is preferably cast in a single piece from clay, or vitreous china and so shaped that it has a trap 19 forming an integral part thereof, the baffle of the trap being shown at 20, and the outlet therefrom to the interior of the bowl being shown at 21. The operation of the device is exactly as disclosed in said Patent No. 1,842,715, the present construction differing therefrom primarily in the fact that the siphon tube is integral with the tank and the trap forms an integral part of the bowl.

Various changes may be resorted to provided they fall within the spirit and scope of the invention.

I claim as my invention:—

A device of the class described comprising a tank, a water supply tube rising therein, a bonnet thereon, a discharge tube communicating with the bonnet and depending therefrom, a valve mechanism for said supply tube, a siphon tube in the tank, a trap communicating with the siphon tube and arranged to trap air between the same and siphon tube, said siphon tube having a vent, a refill tube having its inlet end extending into said discharge tube and having its other end communicating with the siphon tube, said refill tube having portions extending substantially to the lowest water level and to the highest water level of the tank.

WILLIAM J. COLLISON.